Oct. 21, 1958     J. R. BARRON, JR     2,856,812
CHANGE MECHANISM FOR COMBINED SLIDE AND FILM STRIP PROJECTOR
Filed Aug. 14, 1953     3 Sheets-Sheet 1
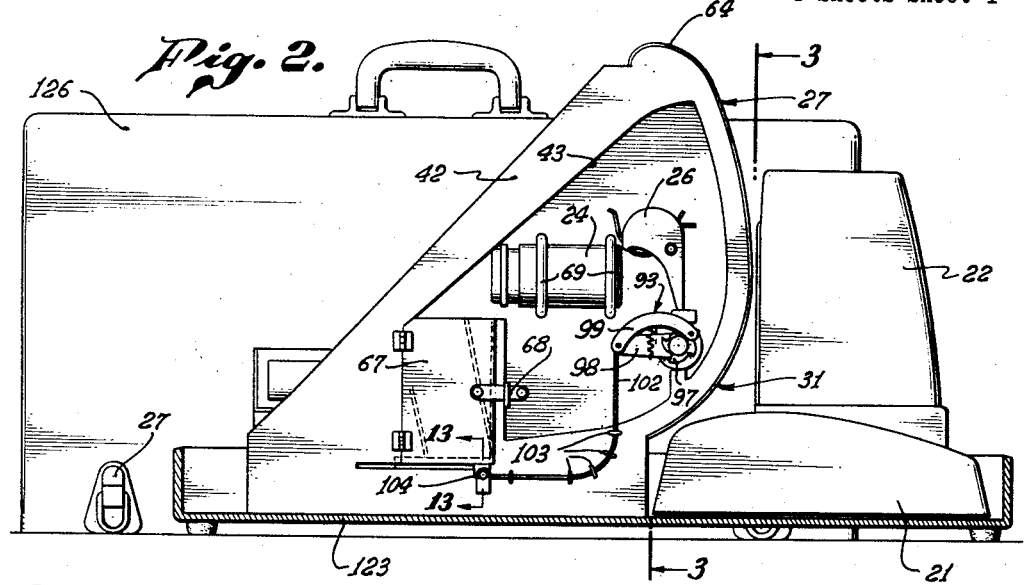
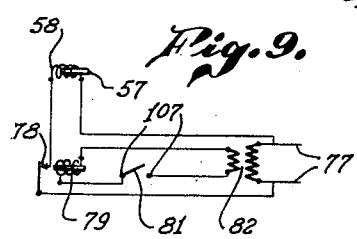
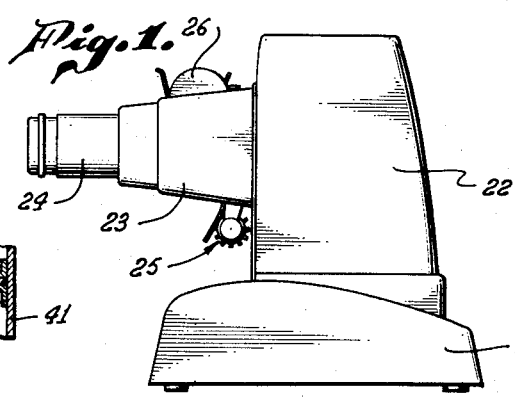
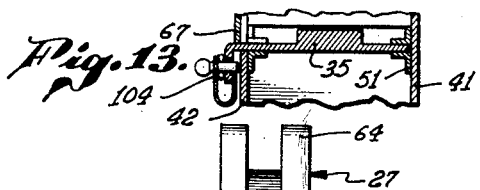
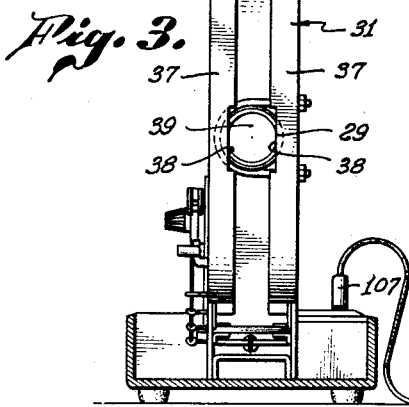
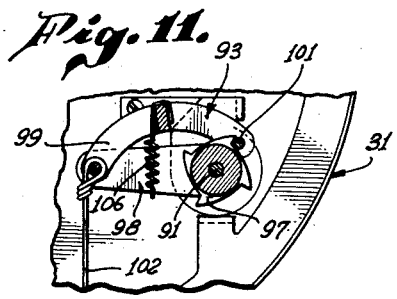
INVENTOR.
JAMES ROY BARRON, JR.
BY
Huebner, Beehler, Worrel & Herzig
by Warren T. Jessup
Attorneys.

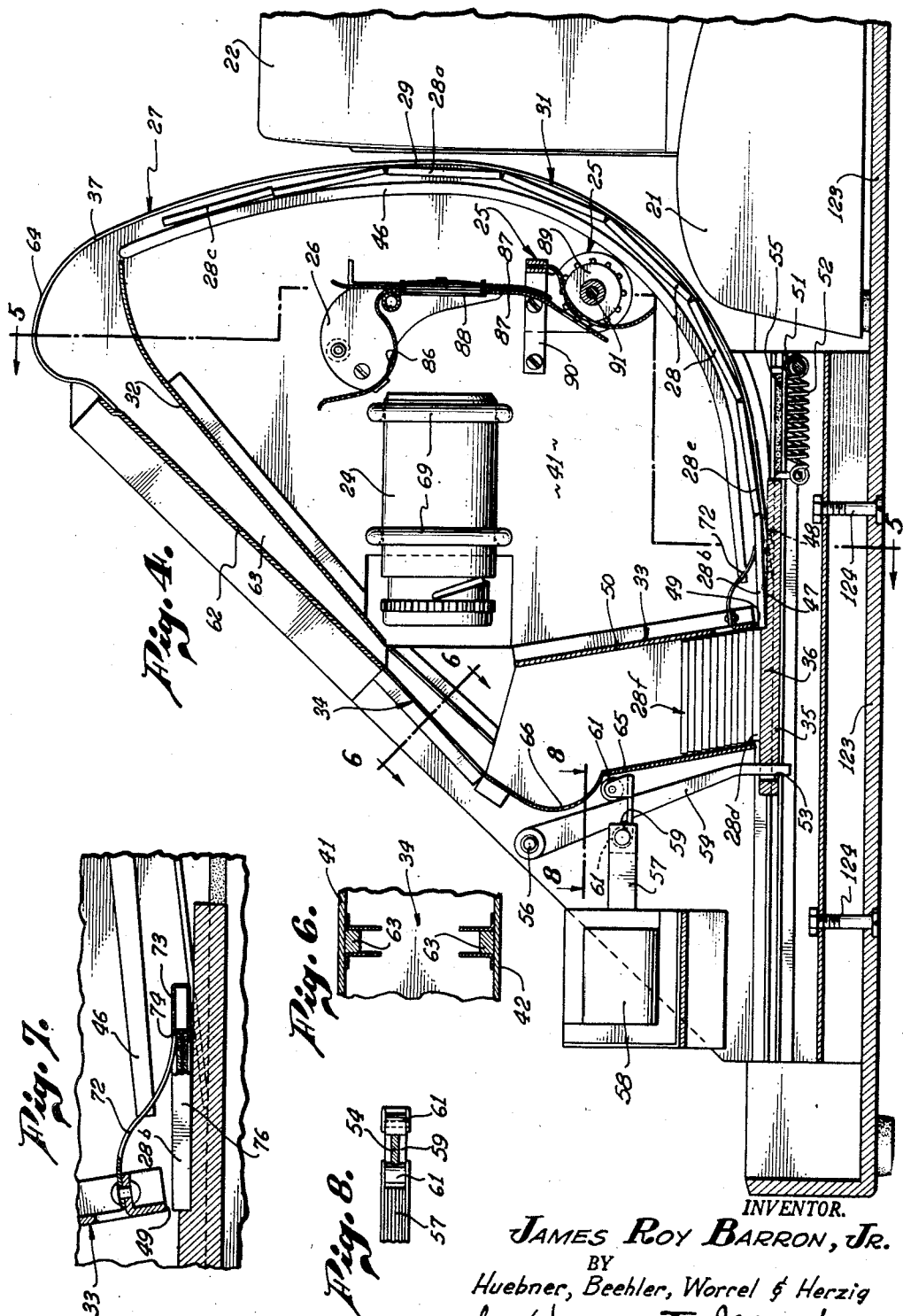

Oct. 21, 1958   J. R. BARRON, JR   2,856,812
CHANGE MECHANISM FOR COMBINED SLIDE AND FILM STRIP PROJECTOR
Filed Aug. 14, 1953   3 Sheets-Sheet 3
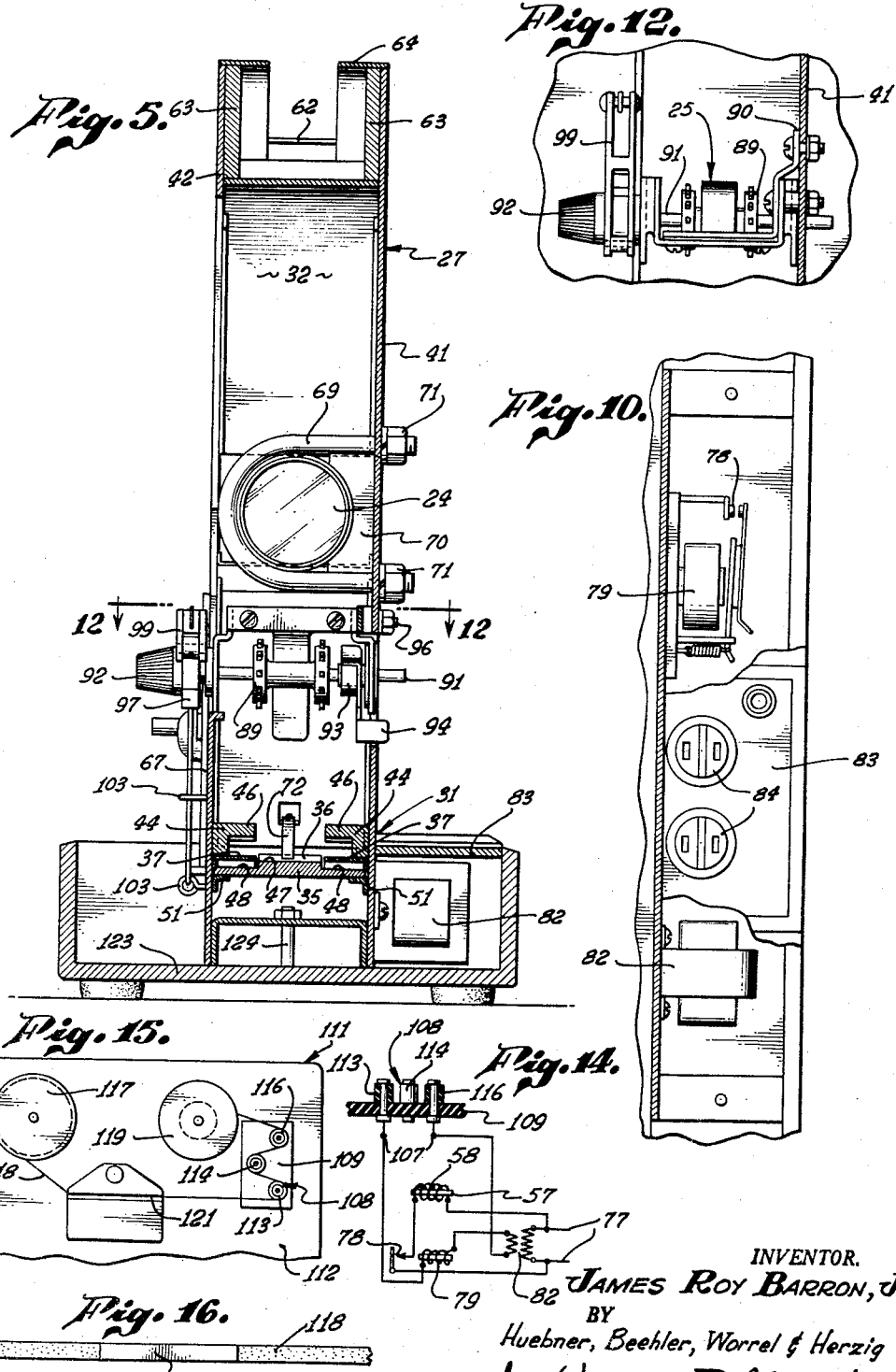
INVENTOR.
JAMES ROY BARRON, JR.
BY
Huebner, Beehler, Worrel & Herzig
by Warren T. Jessup
Attorneys.

United States Patent Office 2,856,812
Patented Oct. 21, 1958

2,856,812

CHANGE MECHANISM FOR COMBINED SLIDE
AND FILM STRIP PROJECTOR

James Roy Barron, Jr., Santa Barbara, Calif.

Application August 14, 1953, Serial No. 374,340

14 Claims. (Cl. 88—28)

This invention relates to slide projector apparatus, and more particularly to an automatic or remote operated mechanism for changing the slides in a slide projector. This invention is equally applicable to a combined slide and film strip projector, and the remote control change mechanism functions equally to change the frames of a film strip as well as the slides of the slide projector.

It is an object of this invention to provide an apparatus which may be applied to practically any type of slide projector for the purpose of permitting slides to be intermittently projected by the projector at the will of the operator and from a remote location.

It is another object of this invention to provide such an apparatus which will permit a conventional slide projector to be adapted for continually showing, in succession, a group of slides without any attention whatever by an operator.

It is another object of this invention to provide slide changing mechanism as above, having means whereby a variable number of discrete, disconnected slides may be successively and repetitively shown or projected by a slide projector without requiring any attention by a human operator.

It is another object of this invention to provide an apparatus for permitting remote control changing or actuation of the pictures in a combined slide and film strip projector, the apparatus of this invention being capable of changing pictures from a remote point in both the slide projecting feature of the projector and also the film strip feature of the projector.

It is a further object of this invention to provide automatic slide changing mechanism which is of simplified and relatively inexpensive construction, and which may be adapted to a wide variety of conventional slide and film strip projectors already on the market.

It is a further object of this invention to provide improved means for causing a tape sound recorder to automatically effect shifting of slides in a slide projector during playback of the tape, whereby an audible program may be automatically synchronized with a visual program, the former originating in the tape and the latter originating in a slide or film strip projector.

It is a still further object of this invention to increase the cooling properties of a projector, around the illuminating lamp, by providing a design in which the lamp is placed outside of the closed slide loop.

It is a still further object to provide a slide changing mechanism of the closed loop type which does not require any special mechanism to move a slide into viewing position.

In accordance with these and other objects which will become apparent in the following specification, a preferred form of the instant invention will be described with reference to the accompanying drawings wherein:

Fig. 1 is a side elevation of a typical combined slide and film strip projector presently on the market, which is suitable for use with the automatic change mechanism of the present invention.

Fig. 2 is a side elevation of the change mechanism of the present invention applied to the projector of Fig. 1.

Fig. 3 is a rear end view of the apparatus of Fig. 2 with the projector removed, and taken on the line 3—3 of Fig. 2.

Fig. 4 is an enlarged elevational section of the apparatus taken generally from the same position as Fig. 2 but with certain parts sectioned.

Fig. 5 is a vertical section taken on the line 5—5 of Fig. 4.

Fig. 6 is a fragmentary cross section taken on line 6—6 of Fig. 4.

Fig. 7 is a fragmentary vertical section illustrating a portion of the apparatus at the beginning of the guideway.

Fig. 8 is a fragmentary sectional view taken on line 8—8 of Fig. 4.

Fig. 9 is a wiring diagram illustrating schematically the electrical connections of the apparatus.

Fig. 10 is a fragmentary plan view partially sectioned, looking down on a portion of the apparatus seen in Fig. 5.

Fig. 11 is a fragmentary elevation, partially sectioned, showing the automatic film strip changing portion of the present invention.

Fig. 12 is a sectional plan view taken on line 12—12 of Fig. 5, showing the film strip changing portion of the invention.

Fig. 13 is a fragmentary sectional view taken on line 13—13 of Fig. 2.

Fig. 14 is a wiring diagram showing schematically an alternative electrical circuit for automatically actuating the slide or film strip changing mechanism of the instant invention.

Fig. 15 is a plan view showing the adaptation of a tape recorder to automatically operate the slide changer in keeping with the circuitry of Fig. 14.

Fig. 16 is a fragmentary view showing a length of recording tape modified in accordance with the present invention.

Referring to the drawings, Fig. 1 shows a conventional combined slide and film strip projector presently on the market. The projector of Fig. 1 has a base 21, atop which is a housing 22, within which is contained a light producing means such as an electric light (not shown). At the fore part of the housing 22, is a light condensing system which serves to concentrate the light for a slide or film strip contained in the apparatus. Normally, the slide which is to be projected by the apparatus is supported in a barrel 23 projecting forwardly from the housing 22; and the slide is then focused onto a screen by means of a light focusing means or lens system 24.

As an alternative, the projector of Fig. 1 includes a film strip supporting or changing mechanism 26 which may be optionally mounted transversely in the barrel 23. The mechanism 26 is inserted into the barrel 23 whenever it is desired to use film strips instead of slides. The mechanism 26 cooperates with a sprocket mechanism 25 secured beneath the barrel 23, which engage the film strip and progressively draw it down through the support 26. The mechanism 26 is readily removed from the barrel 23 and laid to one side when slides are being shown by the projector; the sprocket mechanism 25 is normally not removed, since it does not interfere with slide projection.

When it is desired to employ the apparatus of the present invention so as to adapt the projector of Fig. 1 to automatic changing of slides or film strips, the lens system 24 is removed from barrel 23, and the barrel 23 is removed from the housing 22. The remaining portions of the projector, namely the housing 22 and the base 21, are then firmly mounted at the rear of the automatic changing apparatus of the present invention. As shown in Fig. 2 the barrel 23 is laid aside and not used. The lens system 24 is mounted to the apparatus of the present invention in a manner which will be described hereinafter. The film strip supporting and changing mechanism 26 may or may not be mounted to the apparatus of the present invention, depending on whether it is desired to show slides or film strips with the remote control change apparatus.

Referring now to the other figures in the drawing, particularly to Figs. 2, 3, and 4, the apparatus of the present invention is shown comprised of a closed circuit slide guide means 27. The term "closed circuit" is used to describe this guide means, because the slides are actuated successively through a closed loop or circuit, so that they may be continually shown over and over again without any manual attention being paid to the apparatus, as for example by the loading of a magazine. This feature will presently become apparent hereinafter.

The guide means 27 (Fig. 4) is adapted to receive and guide a plurality of slides 28 around the circuit. The numeral 28 will be used hereinafter to denote the slides generally, while the numeral 28 followed by a letter postscript (e. g. 28a) will denominate particular slides which may be identified for clarity in the description of the operation of the apparatus. The guide means 27 includes a substantially vertical projection or viewing portion 29 forming part of a guideway 31. At the portion 29 one of the slides 28, in this case the slide 28a, is stopped, at least momentarily, to be optically viewed and projected.

The slides 28 are intermittently propelled or pushed counterclockwise (as viewed in Fig. 4) around the circuit by a suitable propelling means. After leaving the viewing portion 29 the slides successively move up to the top of the guideway 31, and are then pushed onto a sloping slideway 32, down which they slide, by gravity, individually and freely, to drop into a magazine 33, where they are stacked and from which they are again successively pushed onto the guideway 31.

In accordance with the present invention, the closed circuit guide means 27 includes an optically clear or transparent portion or projector opening 34. The light beam carrying the projected image of the viewed slide 28a passes substantially horizontally through this opening 34.

In order to successively impel the slides 28 counterclockwise around the closed circuit guide means 27, an impelling means in the form of a flat, reciprocating plunger 36 is provided, formed integrally from a slidably mounted metal plate 35. The plunger 36 operates with each successive reciprocation to push forward the bottom slide in the magazine 33 onto the guideway 31, the bottom slide 28b in turn pushing all of the slides in the guideway 31 ahead of it. The geometry of the guideway 31 is such that with each forward extension of the plunger 36, one of the slides (28a) is brought exactly into viewing portion 29 athwart the light and lens system of the projector.

The lens system 24, removed from the standard projector of Fig. 1, is mounted in the present apparatus between, and aligned with, the viewing portion 29 and the open or clear portion 34 of the circuit 27. The lens system 24 thus focuses the illuminated slide 28a onto a suitable viewing screen. While the lens system 24 may be mounted outside the circuit 27 if desired, as long as it is aligned with the portions 29 and 34, it is preferred to mount it between the two portions 29 and 34, in order to render the apparatus more compact, and to make use of available space on the wall 41 within the loop 27. The light source within the housing 22 is disposed directly behind the viewing portion 29, and preferably aligned therewith, so as to illuminate the viewed slide 28a.

The structure of the closed circuit guide means 27 will now be described.

Referring particularly to Fig. 3, the guideway 31 is shown comprised of a pair of parallel runner rails 37, which lead away from the bottom of the magazine 33 and curve upward past the light housing 22 (Fig. 4), to terminate at the upper end of the apparatus adjacent the top portion of the slideway 32. The rails 37 forming this portion of the guideway 31 terminate at a height higher than the top of the magazine 33 so as to provide sufficient altitude for the slides to slide or drop freely down the slideway 32 into the magazine 33.

At least at the viewing portion 29, the laterally central portion of the guideway 31 is open between the runners or rails 37. This opening is enlarged, in the present embodiment, at the viewing portion 29, by providing a pair of elongate notches 38 in the inner edges of the rails 37, which form a viewing opening 39, through which light from the housing 22 may illuminate the slide 28a positioned at the viewing portion 29.

The guide means 27, in general, is supported by a vertical wall 41 (Fig. 5) forming and closing one side of the apparatus. The other side of the apparatus is left open in order to give access for ready adjustment and alteration of the parts, and for mounting of the lens system 24 and film strip support 26. An opposite side wall 42 serves as a support to which various portions of the circuit or guide means 27 are secured, although the greater portion of the wall 42 is open, providing a large access opening 43 best seen in Fig. 2.

To keep the slides 28 properly aligned in the guideway 31, there are provided a pair of side wall members 44 (Fig. 5) which have integrally formed therewith overhanging ledges 46, that prevent the slides from dropping back out of the guideway 31, particularly in the upper reaches thereof, just before ejection of the slide 28c into the slideway 32.

The plunger 36, which successively impels the bottom slide 28d onto the guideway 31 with each reciprocation thereof, is preferably formed integral with the floor 47 of the magazine 33. Thus the magazine floor 47 is formed with the plate 35, and reciprocates with the plunger 36, although such movement of the floor 47 is not necessary in practicing the present invention.

As best seen in Fig. 5, neither the plunger 36 nor the floor 47 extend laterally the full width of the guideway 31. The plate 35 from which the parts 36 and 37 are formed is relieved at each side, as shown at 48; and the starting or tip ends of the runners or rails 37 extend obliquely downward past and beside the floor 47, into the relieved portions 48.

When the plunger 36 is retracted to the left (Fig. 4), by a means which will be described hereinafter, the forward edge of the plunger clears the rear edge of the bottom slide 28d, which thereupon drops down from the plunger 36 onto the floor 47. The succeeding forward stroke of the plunger 36 then pushes the slide 28d into the position shown at 28b in Fig. 4. As this operation is taking place, the forward edge of the slide comes into engagement with the upper surface of the oblique runners or rails 37, and the slide is thus lifted smoothly, and without any danger of edge jamming, onto the guideway 31. The next reciprocation of the plunger 36 pushes the slide 28b into the position shown in 28e and thus successively upward into viewing position at 28a. The lower edge 49 of the forward wall 50 of the magazine 33 is spaced above the floor 47 a distance slightly greater than the thickness of a slide 28. Thus only one slide is permitted to be ejected from the magazine 33, while all the slides thereabove are blocked by the forward wall 50.

The plate 35, from which the plunger 36 and floor 47 are formed, is suitably mounted for reciprocation by sliding on a pair of angular members 51 secured inside the slide walls 41 and 42, respectively. The plunger 36 is biased toward its forward position by a spring 52 secured between the plate 35 and any suitable portion of the apparatus housing or casing. The forward end of the plate 35 abuts a pair of stop tabs 55 turned up from the angle rails 51. Thus in extended position the forward edge of the plunger 36 always comes to rest at the same place, thereby insuring that the viewed slide 28a will always register properly at the window 39.

At its other end the plate 35 is slotted at 53 to receive a downwardly extending arm 54 pivoted for oscillation about a shaft 56. The arm 54 is actuated back and forth by the reciprocation of the core 57 of an electrically energizable solenoid 58. The end of the core 57 is slotted at 59 to receive the arm 54 passing therethrough, and a pair of rollers 61 bracket arm 54 to lessen the friction of the actuation of the arm 54.

It will thus be seen that whenever the solenoid 58 is energized, the arm 54 is retracted to the left (Fig. 4), retracting the plunger 36 and allowing the bottom slide 28d to drop onto the floor 47, immediately in front of the plunger 36. When the solenoid 58 is de-energized, the spring 52 impels the plunger 36 forward, pushing the slides 28 ahead of it. This action replaces the slide 28a previously in viewing position; and causes another slide to be projected through the lens system 24, through the projector opening 34, and thence onto a viewing screen (not shown). Each such actuation of the plunger 36 also pushes the top slide 28c from the guideway 31 onto the slideway 32.

The slideway 32 is suitably curved at the top to receive the slide 28c from the guideway 31. The top of the slideway 32 is preferably covered by a roof 62. Spacers 63 (Fig. 6) are secured within the walls 41 and 42, respectively, to narrow the width of the slideway 32, so as to more snugly receive the slides 28 while still permitting free downward sliding thereof.

In the embodiment illustrated the slideway 32 terminates at the transparent or open portion 34, the upper edge of which is slightly above the effective level of the lens system 24. In this way the slideway 32 does not appreciably block the light passing through the lens system 24. At the upper end of the slideway 32 and forming an upper continuation of the roof 62 is a curved portion 64, which smoothly connects the upper end of the roof 62 with the upper ends of the runners or rails 37, and serves to smoothly deflect the slides 28 into the slideway 32 as they are ejected upward out of the guideway 31.

If desired, the rails 37 and ledges 46 may continue up and around and down toward the magazine 33, to become in effect the slideway 32, instead of having a physical termination in the guideway structure.

With each operation of the plunger 36, the upper slide 28c is ejected into the slideway 32, and slides individually and freely thereafter, and drops freely across the open portion 34 into the magazine 33. In thus dropping across the opening 34, the slide momentarily cuts the light beam from the lens system 24; but this momentary shadow, being associated as it is with the changing of the viewed slide 28a, does not in practice detract from the viewing effect on the screen.

In order to properly accommodate the slides 28f in the magazine 33, it is desirable that the magazine 33 be generally upright or vertical. In this way, the force of gravity will tend to lower each of the slides into position where it can be operated upon by the plunger 36. If the magazine 33 were not generally vertical, some means would have to be provided for biasing or moving the slides 28f to the feed-out end of the magazine.

While substantial verticality of the magazine 33 has been found desirable, it has been found in practice advisable to slope or slant the magazine 33 slightly, as shown in Fig. 4. In practice, a slope of one inch horizontal to four and one-half inches vertical has been found to be within an optimum range. As seen in Fig. 4, the slant of the magazine 33 from bottom to top is away from the opposite portion of the guide means 27, i. e., away from the viewing portion 29.

In order to insure that the slides 28f, as they are stacked in the magazine 33, will be stacked in the same attitude which they originally occupied before circling the loop 27, it is necessary that each slide be turned over after it leaves the slideway 32 and before it is stacked in the magazine 33. That is, the bottom face of the slide as it falls down the slideway 32 must come out on top in the stack 28f.

To this end the upper portion of the back wall 65 of the magazine 33, facing the slideway 32 and opening 34, is provided with a concave portion 66, which receives the slide as it clears the opening 34, and deflects it around so that the forward edge of the slide is reversed in direction and directed toward the front wall 50. As the leading edge of the slide strikes the wall 50 of the magazine 33, prior to dropping down on the stack 28f, there may be at times a tendency for the trailing edge of the slide to flip up and turn over, thus inverting the slide, or even leaving it standing on edge on the stack 28f. The slant in the magazine 33 precludes this possibility; since if the slide does flip up, the rear edge strikes the sloping wall 50 and drops back into proper position atop the stack 28f.

The side wall of the magazine 33 coplanar with the side wall 42 is made in the form of a door 67 which may be held closed by a latch mechanism 68. The door 67 permits more ready filling and emptying of the magazine 33 with slides 28f.

The lens system 24 is secured in position in the apparatus by being mounted to the slide wall 41. A saddle 70 is secured to the inside of the wall 41 (Fig. 5) and the lens system 24 is held sidewise against the saddle 68 by a pair of U bolts 69. The nuts 71 on the U bolts 69 may be readily loosened when it is desired to remove the lens system 24 and reassemble it into the projector, shown in Fig. 1.

With each retraction (leftward in Fig. 4) of the plunger 36, there is a tendency for the slides to move to the left, because of the weight of the column of slides and also the frictional engagement of the slide 28b with the floor 47. If this were permitted the apparatus would jam, because the next slide 28d could not drop down flat on the floor 47.

To preclude this, a check member in the form of a resilient leaf spring 72 is mounted to the wall 50 and projects downwardly into engagement with the slide 28b. As shown in Fig. 7, a typical slide is mounted in a holder or frame 73, which forms a shoulder 74 around the slide 76 proper. The end of the detent 72 abuts this shoulder 74, preventing the slide 28b from moving back into the magazine 33.

It will be noted that the present invention employs the advantages of a closed slide circuit without requiring special handling of a slide at the viewing position. The viewing position or portion 29 on the guideway 31 is simply that portion of the guideway 31 which comes opposite the light condensing opening of the projector housing 22. While it is marked, in the embodiment shown, by the widening notches 38, even this characteristic is not necessary if the rails 37 are made narrower.

It will be further noted that the closed circuit advantages are retained without placing the light source inside the loop. Such placement would tend to trap the resulting lamp heat within the ring of slides, and subject them to an undesirably high temperature.

The electrical circuit for energizing the solenoid 58 is shown in Fig. 9. It will be seen that the solenoid is energized from the source of house voltage, 60 cycle, 110–120 volts, shown at 77, through the switch or contact 78 of a relay 79. The purpose of the relay 79 is to permit operation of the equipment by a remote switch 81 without requiring the application of high voltage to the remote switch 81. This is effected by connecting a step-down transformer 82 across the line 77, and energizing the relay 79 from the secondary of the transformer 82 through the remote switch 81. It will be understood that the wires leading to the switch 81 may be as long as desired, thus permitting the operator to stand at some distance from the projector and still operate the apparatus by intermittent energization of the solenoid 58.

The operating parts of the circuit shown in Fig. 9 are housed beneath a cover 83 at the side of the apparatus proper, as shown in Figs. 5 and 10. If desired, a pair of convenience outlets 84 may also be incorporated into the circuit of Fig. 9, as shown in Fig. 10, in order to provide a ready source of house voltage for auxiliary equipment.

In order to direct the projected image either up or down, and in preference to tilting the whole assembly, a deflecting prism may be adjustably mounted in front of the lens system 24, or in front of the projector opening 34. In this way the image may be directed onto a viewing screen which is higher or lower than the projecting apparatus.

As mentioned hereinbefore, it is a feature of this invention that the apparatus may also be used to automatically change the frames of a film strip, as well as to change slides. For this use the film strip support 26 is mounted within the loop 27 and against the wall 41, as shown in Figs. 2 and 4. The apparatus 26 includes a concave roll holder 86 into which may be deposited a rolled film strip. The leading edge of the film strip is brought down between a pair of guide plates 87, wherein is formed a viewing aperture 88, through which the illuminating light from the housing 22 passes.

The mechanism or assembly 25 carrying the sprocket wheels 89 is removed from the barrel 23 and remounted to the wall 41, by means of a bracket 90. This mounting is such that the sprocket wheels 89 have the same position relative to the support 26, as they have in the unmodified projector, shown in Fig. 1. The sprocket holes of the film strip are engaged by the teeth of the sprocket wheels 89, which are secured to a shaft 91, to the extended end of which is mounted a knob 92, by means of which the shaft may be turned. A conventional detent mechanism 93 permits the shaft 91 to come to rest only at selected positions, at which positions the frame of the film strip will be in registry with the aperture 88. Proper framing of the film is achieved through a framing lever 94. The film strip holder 26 and sprocket wheel assembly 25 thus described are conventional, and per se form no part of the present invention.

When it is desired to show film strips with the present invention, the support 26 is secured within the loop 27 and to the wall 41 by means of a bolt 96 (Fig. 5). In accordance with the present invention, the sprocket mechanism 25 is modified as shown particularly in Fig. 11. This modification consists in mounting a ratchet wheel 97 fixedly to the shaft 91, and mounting a lever arm 98 so that it freely pivots on the shaft 91. To the extended end of the arm 98 is pivoted a ratchet dog 99 having a pair of parallel arms between which extends a catch member 101 that engages successively behind the teeth of the ratchet wheel 97, as shown in Fig. 11. Also to the end of the arm 98 is secured a flexible cable 102, which is guided by fixed eyelets 103 to a connection with the reciprocating plate 35 from which the plunger 36 is formed. The cable 102 is made readily detachable from the plate 35 by means of a quick attaching mechanism 104.

From the above it will be seen that each leftward stroke of the plate 35 (Fig. 4) draws the arm 98 (Fig. 11) in a counterclockwise arc, thereby rotating the ratchet wheel 97 and shaft 91 through a predetermined arc. This distance is, by suitable design of detent 93 and wheel 97, just sufficient to rotate the sprocket wheel 89 enough to bring a new frame of the film strip into position opposite the viewing aperture 88. When the solenoid 58 is deenergized, a torsion spring (not shown) biasing the arm 98 clockwise (in Fig. 11) causes the arm 98 to return to its quiescent or unenergized position. During this return, the catch 101 on the arm 99 rides up the sloping surface of the tooth on the ratchet wheel 97, and then snaps behind the tooth, by virtue of a biasing spring 106 stretched between the detent dog 99 and the arm 98.

It is thus seen that the remote operating circuit shown in Fig. 9 may be used selectively, either to cause automatic changing of slides in the slide guide 27, or to cause automatic changing of frames in a film strip held in the film strip support mechanism 26.

Under some circumstances it is desirable that the change mechanism be actuated automatically, rather than by manual operation of the switch 81. One such means for automatically actuating the change mechanism, in this case actuation in synchronism with an audible recording means such as a tape recorder, is shown in Figs. 14, 15, and 16. Here the terminals 107 to which the switch 81 is connected in Fig. 9, are connected instead to a special switch 108, which will presently be described. The other portions of the circuit are the same as those previously described and shown in Fig. 9. The switch 108 comprises a flat base member 109 adapted to be mounted to a tape recorder 111 in a plane which is substantially even with the top surface or operating plane 112 of the recorder 111. Extending upward or outward from the base 109 are three posts 113, 114, and 116. At least the two outer posts 113 and 116 are electrically conductive, and form the two terminals of the switch connected across the terminals 107 of the operating circuit, as shown in Fig. 14.

As shown in Fig. 15, the recorder 111 consists of a conventional take-up reel 117 to which a flat recording tape 118 is fed from a supply reel 119, and through a recording and playback head 121. In accordance with the present invention, the tape 118, instead of being passed directly from the supply reel 119 to the head 121, is passed around the post 116, thence around the opposite side of the post 114, and finally around the post 113, before being led to the recording head 121. Either interposed in the tape 118 or secured to the inside surface thereof, is a length of conducting material such as conducting foil 122. The length of the strip 122 is at least as long as the tape-path distance between the two outer posts 113 and 116.

In operation, at an appropriate moment as the strip 122 passes between the posts 113—116, a conducting path is completed from the post 116 to the post 113, thus closing the circuit between the terminals 107 and causing actuation of the relay 79 with consequent operation of the slide changing mechanism.

In practice the conductive strip 122 is inserted in or on the tape 118 at just the moment in the audible program when it is desired that the slide should change.

It is thus possible to run off, completely automatically, a combined audio and visual program. For example, the program may consist of a series of slides, for each of which a spoken commentary is to be played at the time the slide is projected. The commentary is played by the recorder 111 and at the moment when the commentary ends the conductive strip 122 is inserted. This causes the slide projector to shift to the next slide just as the next commentary is beginning.

For compactness and convenience of portability, it is desirable to mount both the apparatus of the present invention and the conventional slide apparatus 21—22 in a single case. Such a case is shown in Fig. 2, consisting of a shallow bottom portion 123 to which is securely mounted by bolts 124 (Figs. 4 and 5) the slide changer of the present invention. The base 21 carrying the housing 22 is likewise fixed to the floor 123. Thus the relative position between the housing 22 and the slide changing apparatus of the present invention is fixed, and it is not necessary to readjust them each time the apparatus is used.

The deep top or cover 126 is provided, which secures to the base 123 by suitable catches 127, to cover and house the entire apparatus.

The entire operation of the apparatus will now be described.

The barrel 23 is first removed from the housing 22, and the base 21 is mounted to the floor 123 to which has already previously been mounted the apparatus of the present invention. The lens system 24 is then removed from the barrel 23 and mounted to the wall 41 by means of the U bolts 69. The apparatus is now ready to receive and show separate, discrete slides 28.

The door 67 is opened by the latch 68 and a stack of slides of variable number is placed in the magazine 33, as shown in Fig. 4.

The primary winding of the transformer 82 is then energized by connecting it to a suitable source of alternating voltage 77. With each closing and opening of the switch 81, the solenoid 58 is energized and deenergized to cause reciprocation of the plate 35. Each reciprocation of the plate 35 causes the plunger 36 to impel a bottom slide 28 into the guideway 31.

In the meantime, the light source in the housing 22 has been turned on and the apparatus directed generally toward a viewing screen. When the first slide 28 in the series, this being the slide which was originally on the bottom of the stack 28f, reaches the viewing portion 29 as shown at 28a, an image appears on the viewing screen. It is then only necessary to focus this image by proper adjustment of the lens system 24.

Thereafter, each successive closing and opening of the switch 81 causes a new slide to be pushed from the bottom of the stack 28f, and consequently causes a new slide 28a to be moved up into viewing position. After several such operations (eight in the embodiment shown), the slide first in line will have reached the upper position shown at 28c. The next operation of the switch 81 causes this slide 28c to be ejected upwardly onto the slideway 32. It then slides freely and individually down the slideway 32, across the transparent or open portion 34, thence to the curved portion 66 where it is turned over. It then immediately falls on the top of the stack 28f, ready to be shown again, should it be desired that the series of slides be repeated.

If it is desired to show a film strip instead of slides, it is only necessary to open the door 67 and remove the stack 28 from the magazine 31. Through the large access opening 43 all of the slides in the guideway 31 may be pushed upward onto the slideway 32 from which they slide down into the magazine 33 and are then readily removed. Thus the machine may be emptied completely of slides 28.

The film strip support 26 and sprocket mechanism 25 are mounted to the wall 41. A film strip is then threaded through the support 26 and engaged by the sprocket wheel 89. When the first frame comes into position at the viewing window 88, it will generally be necessary to re-focus the lens system 24 because of the different positioning of the viewing plane.

The cable 102 which was previously disconnected from the plate 35, is now secured to the plate 35 by the quick securing means shown at 104 in Fig. 13. Thereafter, each reciprocation of the plate 35, effected by closing and opening of the switch 81, causes a corresponding reciprocation of the cable 102. This reciprocation, through the oscillation of the arm 98 and detent catch 101, causes successive, predetermined rotation of the shaft 91, to bring successive frames of the film strip into view at the viewing window 88.

Thus the apparatus may be used selectively for automatic showing of either separate individual slides, or the connected frames in a length of film strip.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

What is claimed is:

1. In combination in a slide projector, a magazine adapted to contain a stack of transparent slides; a guideway leading from the bottom of said magazine, curving upward, and terminating at a level above said magazine, said guideway including a substantially vertical projection portion disposed higher than the top of said magazine, said guideway being adapted to guide slides upward from the bottom of said magazine, the laterally central portion of said guideway being open at least at said projection portion to permit passage of substantially horizontal light rays through a slide positioned in said portion; a plunger movably mounted to engage the bottom slide in said magazine and push it forward in said guideway, said bottom slide pushing the slides ahead of it up the guideway past said projection portion; a slideway inclined down from the top of said guideway toward the top of said magazine to receive slides pushed up from said guideway and slide them down to said magazine, said slidaway terminating at a level higher than said projection portion, thereby leaving a projector opening for the passage of light rays; lens means aligned with and disposed between said projection portion and said proejctor opening and effective to focus said light rays; and light means aligned with said projection portion, lens means, and projector opening, and disposed outside said guideway.

2. The combination of claim 1 including detent means adjacent the forepart of said guideway adapted to engage at least one slide therein to inhibit retraction of said slide in the circuit.

3. In slide projector apparatus comprising the combination of closed circuit guide means adapted to guide a plurality of disconnected slides around the circuit, said guide means including a projection portion at which each slide is projected optically, means for impelling at least one slide intermittently in the circuit, and light means for shining light on a slide at said projection portion, said apparatus being characterized by an optically clear or transparent portion in said guide means located substantially opposite said projection portion, light from said light means passing to a slide in said projection portion and thence through said open portion.

4. Apparatus according to claim 3 wherein said guide means includes a downwardly sloping slideway immediately preceding said clear portion in the circuit, the slides sliding one by one freely down said slideway and across said open portion with only momentary interruption of the light passing through said clear portion.

5. Apparatus according to claim 4 wherein said guide means includes also a magazine adapted to hold a variable number of slides and located after said clear portion in the circuit.

6. Apparatus according to claim 5 wherein the slides are pushed around the circuit in edge-to-edge relation, wherein said magazine is generally upright and of a cross section slightly larger than the area of a slide, and wherein said impelling means comprises a reciprocating plunger effective to engage the bottom slide in the magazine and push it forward in the circuit.

7. Apparatus according to claim 6 wherein said magazine is slanted slightly from bottom to top away from said viewing portion, thereby to insure accurate stacking of slides therein.

8. Apparatus according to claim 6 wherein said magazine includes a concave guide wall facing said clear portion and adapted to assist in turning the slides over just before they are stacked in the magazine.

9. In combination in a slide projector, closed circuit guide means adapted to receive and guide slides around the circuit, said guide means including a projection portion at which each slide is projected optically, said guide means also including an optically clear or transparent portion substantially opposite said projection portion, light focusing means disposed between and aligned with said portions, and light means for illuminating a slide at said projection portion.

10. Mechanism for successively impelling articles, such as slides, from the bottom of a magazine onto a guideway, comprising in combination: a guideway including runner rail means and upstanding side rail means, a magazine floor disposed in general alignment with said guideway, the tip of said runner rail means extending obliquely downwardly past and beside said floor, a plunger extending above said floor and adapted to engage the edge of a slide in the magazine and push it onto said guideway, said slide resting on said floor and being gradually lifted away therefrom by sliding engagement of the slide with the oblique runner rail means, as the slide is pushed forward by the plunger.

11. Automatic change mechanism for a combined slide and film strip projector comprising, in combination, closed circuit guide means adapted to receive and guide slides around the circuit, said guide means including a projection portion at which each slide is viewed optically and projected, said guide means also including an optically clear or transparent portion substantially opposite said projection portion, selectively operable plunger means for impelling slides around said guide means, light focusing means aligned with said projection and clear portions, light means for illuminating a slide at said projection portion, film strip supporting and changing means disposed between said focusing means and said projection portion for successively moving the frames of a film strip into projection position, and means adapted to link said plunger means to said film strip means to actuate the latter upon selective operation of said plunger means.

12. Automatic change mechanism for a combined slide and film strip projector comprising, in combination, closed circuit guide means adapted to receive and guide slides around the circuit, said guide means including a projection portion at which each slide is viewed optically and projected, said guide means also including an optically clear or transparent portion substantially opposite said projection portion, selectively operable plunger means for impelling slides around said guide means, light focusing means disposed within said guide means between and aligned with said projection and clear portions, light means outside said guide means and aligned with said portions and said focusing means for illuminating a slide at said projection portion, film strip supporting and changing means disposed between said focusing means and said projection portion for successively moving the frames of a film strip into projection position, and means adapted to link said plunger means to said film strip means to actuate the latter upon selective operation of said plunger means.

13. Slide projector apparatus comprising in combination: closed circuit guide means adapted to guide a plurality of disconnected slides around the circuit; said guide means including a projection portion at which each slide is projected optically; means for impelling at least one slide intermittently in the circuit; light means for shining light on a slide at said projection portion; said guide means including generally vertical magazine means for stacking a variable number of slides, a downwardly sloping slideway located above and sloped toward the top of said magazine means, and curved guide means at the top of said magazine means for turning over each slide as it passes from the slideway into the magazine.

14. Apparatus according to claim 13 wherein said magazine means is slanted slightly away from the vertical, thereby better to insure proper stacking of slides therein.

References Cited in the file of this patent
UNITED STATES PATENTS

| | | |
|---|---|---|
| 1,215,694 | Osborne | Feb. 13, 1917 |
| 1,247,608 | Alguire | Nov. 27, 1917 |
| 1,443,711 | Lauchly | Jan. 30, 1923 |
| 1,627,396 | Lehmann | May 3, 1927 |
| 2,069,631 | Thomas | Feb. 2, 1937 |
| 2,151,629 | Wallis | Mar. 21, 1939 |
| 2,279,119 | Freimann | Apr. 7, 1942 |
| 2,294,219 | Woermann | Aug. 25, 1942 |
| 2,396,409 | Berzer | Mar. 12, 1946 |
| 2,424,295 | Williams | July 22, 1947 |
| 2,521,506 | Dutton | Sept. 5, 1950 |
| 2,593,007 | Cadwell et al. | Apr. 15, 1952 |
| 2,653,512 | Brock | Sept. 29, 1953 |
| 2,704,486 | Wilson | Mar. 22, 1955 |

FOREIGN PATENTS

| | | |
|---|---|---|
| 11,324 | Great Britain | of 1910 |